United States Patent [19]

Thaler et al.

[11] 4,442,011

[45] Apr. 10, 1984

[54] DRILLING MUD VISCOSIFICATION AGENTS BASED ON SULFONATED IONOMERS

[75] Inventors: Warren A. Thaler, Aberdeen, N.J.; Thad O. Walker, Humble, Tex.; Robert D. Lundberg, Bridgewater; Joseph Wagensommer, Westfield, both of N.J.

[73] Assignee: Exxon Research and Engineering Co., Florham Park, N.J.

[21] Appl. No.: 332,770

[22] Filed: Dec. 21, 1981

[51] Int. Cl.³ ............................................... C09K 7/06
[52] U.S. Cl. ........................... 252/8.5 M; 252/8.5 P; 525/331.8
[58] Field of Search ................ 252/8.5 M, 8.5 P; 525/331.8

[56] References Cited

U.S. PATENT DOCUMENTS

| | | | |
|---|---|---|---|
| 2,099,825 | 11/1937 | Rolshausen et al. | 252/8.5 |
| 2,552,775 | 5/1951 | Fischer et al. | 252/8.5 |
| 2,650,905 | 9/1953 | Fordyce | 252/8.5 |
| 2,743,233 | 4/1956 | Fisher | 252/8.5 |
| 2,801,967 | 8/1957 | Wilson | 252/8.5 |
| 3,099,624 | 7/1963 | Wilson | 252/8.5 |
| 3,478,002 | 11/1969 | Nakaguchi et al. | 525/331.8 |
| 3,931,021 | 1/1976 | Lundberg | 252/32.5 |
| 4,153,588 | 5/1979 | Makowski et al. | 524/399 X |
| 4,195,013 | 3/1980 | Zarauz | 524/553 |

*Primary Examiner*—Herbert B. Guynn
*Attorney, Agent, or Firm*—Richard E. Nanfeldt

[57] ABSTRACT

A new family of viscosification agents based on sulfonated ionomers is described for oil-based drilling muds. The resultant muds display good viscosity characteristics and good stability when formulated from ionomers having an appropriate sulfonate level, cation type, and cosolvent content.

9 Claims, No Drawings

DRILLING MUD VISCOSIFICATION AGENTS BASED ON SULFONATED IONOMERS

FIELD OF THE INVENTION

A new family of viscosification agents based on sulfonated ionomers is described for oil-based drilling muds. The resultant muds display good viscosity characteristics and good stability when formulated from ionomers having an appropriate sulfonate level, cation type and cosolvent content.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps of fatty acids), wetting agents (dodecylbenzene sulfonate), water, barite or barium sulfate, (weighting agent), asbestos (employed as viscosification agent), amine treated clays (also as viscosification agent).

The above combination of ingredients is generally formulated to possess various weights based primarily on amount of barite added. For example, a typical drilling mud can vary in specific gravity from a range of about 7 lbs. per gallon up to 17 lbs. per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems both during the mud formulation and potentially during the subsequent use of such formulations. Therefore, it is desirable to eliminate the use of asbestos completely in such drilling muds. On the other hand, the use of substitutes for asbestos in this application, heretofore, has not been particularly successful in that the resulting viscosification agents must maintain adequate viscosities under the drilling conditions which can involve high temperature and high shear conditions.

This invention describes an approach to viscosification of oil-based drilling muds which permits the substitution of sulfonated ionomers for asbestos fines. The resulting polymer-modified drilling muds display viscosities which are in a desirable range for drilling mud applications, good viscosities at retention after aging at temperatures as high as 325° F. for 24 hours.

The types of sulfonated polymers that are envisioned in the present invention are sulfonated ethylene/propylene/5-phenyl-2-norbornene terpolymers. Ionomers of EPDM's have, in the past, been prepared by sulfonating terpolymers of ethylene-propylene and a diolefin. The resulting polymers contain aliphatic sulfonates after "neutralization". Many of the sulfonates of commerce are aromatic sulfonates. The aromatic sulfonates are generally preferred because they are prepared more cleanly and are more stable than olefin (aliphatic) sulfonates. For example, long chain olefins are utilized to alklate aromatics like benzene, and the alkylated aromatics are sulfonated to produce detergents. Even though such a process requires an extra step, it is generally preferred, rather than to sulfonate the olefin directly. Thus, detergents produced via the aromatic sulfonation are produced more cleanly and have greater stability.

By analogy, we have produced ethylene/propylene-based ionomers in which the sulfonate group is bonded to an aromatic ring. The resulting polymers are thermally stable and are useful viscosifiers for drilling muds. These polymers have better low temperature properties than sulfonated polystyrenes while maintaining the stability associated with aromatic sulfonates. These polymers possess suitable solubilities in the drilling mud environment.

SUMMARY OF THE INVENTION

The present invention relates to sulfonated ethylene/propylene/5-phenyl-2-norbornene terpolymers which function as viscosification agents when added to oil-based drilling muds which are the fluids used to maintain pressure, cool drill bits, and lift cutting from the holes in the drilling operation for oil and gas wells. The sulfonated ethylene/propylene/5-phenyl-2-norbornene terpolymers have about 5 to about 30 milliequivalents of sulfonate groups per 100 grams of the sulfonated polymer, wherein the sulfonated group is neutralized with a metallic cation or an amine or ammonium counterion. A polar cosolvent can optionally be added to the mixture of oil drilling mud and sulfonated elastomeric polymer, wherein the polar cosolvent increases the solubility of the sulfonated elastomeric polymer in the oil drilling mud by decreasing the strong ionic interactions between the sulfonate groups of the sulfonated elastomeric polymer.

GENERAL DESCRIPTION

The present invention describes a new class of viscosification agents for oil-based drilling muds which are used during operation of gas and oil wells, wherein these viscosification agents are sulfonated ethylene/propylene/5-phenyl-2-norbornene terpolymers.

The oil-based drilling muds of the instant invention minimally comprise, but can also include, other additives, an organic liquid such as an oil, fresh water or salt water, an emulsifier, a wetting agent, a weighting material and sulfonated polymer. In general, the specific gravity of the oil-based drilling mud has a specific gravity of about 7 lbs. per gallon to about 20 lbs. per gallon, more preferably about 10 to about 16, and most preferably about 12 to about 16.

A typical oil-base drilling mud, as envisioned by the instant invention comprises: an oil; about 1 to about 10 parts by weight of water per 100 parts by weight of the oil, more preferably about 3 to about 5; about 20 to about 50 lb/barrel or bbl of an emulsifier and/or supplementary emulsifier to about 5 lb/bbl of a wetting agent weight material necessary to give the desired mud density; and about 0.25 to about 2 lb/bbl of a sulfonated polymer. Higher levels of sulfonated polymer can be employed but it is not normally economically attractive.

The oil employed in the oil-based drilling mud is generally a No. 2 diesel fuel, but it can be other commercially available hydrocarbon solvents such as kerosene, fuel oils or selected crude. If crudes are used, they should be weathered and must be free of emulsion breakers. (Emulsion breakers are chemicals often employed in separating crude oil from emulsified water.)

Typical, but nonlimiting, examples of suitable emulsifiers which can be readily employed are magnesium or calcium soaps of fatty acids. Typical, but nonlimiting, examples of a suitable wetting agent which can be readily employed is an alkylaryl sulfonate. Typical, but nonlimiting, examples of a weighing material which can be readily employed is barite or a barium sulfate which may optionally be surface treated with other cations, such as calcium.

The neutralized sulfonated elastomeric polymers employed in the oil-based drilling muds are ethylene/propylene/5-phenyl-2-norbornene.

The ethylene/propylene/5-phenyl-2-norborene terpolymers of the instant invention have about 0.5 to about 20 wt.% phenylnorbornene, more preferably about 1 to about 10, most preferably about 2 to 8. The preferred polymers contain about 10 to about 80 wt.% ethylene and about 1 to about 10 wt.% of 5-phenyl-2-norborene monomer, the balance of the polymer being propylene. Preferably, the polymer contains about 30 to about 70 wt.% ethylene, e.g. 50 wt.% and about 2 to about 8 wt.% phenyl-2-norborene monomer, e.g. 5.0 wt.%.

A typical ethylene/propylene/5-phenyl-2-norborene terpolymer has a Mooney viscosity (ML, 1+8, 212° F.) of about 16 and has an ethylene content of about 50 wt.% and a 5-phenyl-2-norborene content of about 5 wt.%.

The terpolymers of this invention have a number average molecular weight ($\overline{M}n$), as measured by GPC, of about 5,000 to about 300,000, more preferably of about 10,000 to about 100,000, and most preferably of about 20,000 to about 80,000. The Mooney viscosity ($\overline{ML}$, 1+8, 212° F.) of the terpolymer is about 5 to about 90, more preferably about 10 to about 80, most preferably about 15 to about 50.

In carrying out the invention, the elastomeric polymer is dissolved in a nonreactive solvent such as a chlorinated aliphatic hydrocarbon, or an aliphatic hydrocarbon such as carbon tetrachloride, dichloroethane, chloroform, cyclohexane, pentane, isopentane, hexane, isohexane, or heptane, or mixture of chlorinated and hydrocarbon solvents. A sulfonating agent is added to the solution of the elastomeric polymer and nonreactive solvent at a temperature of about $-100°$ C. to about $100°$ C. for a period of time of about 1 to about 60 minutes, most preferably at room temperature for about 5 to about 45 minutes; and most preferably about 15 to about 30. Typical sulfonating agents are described in U.S. Pat. No. 3,642,728 previously incorporated herein by reference. These sulfonating agents are selected from a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are dioxane, tetrahydrofuran, tetrahydrothiophene, or triethylphosphate.

It should be pointed out that neither the sulfonating agent nor the manner of sulfonation is critical, provided that the reagent is sufficiently reactive to affect the desired sulfonation, the sulfonating method does not degrade or cross-link the polymer. The reaction is quenched with an aliphatic alcohol such as methanol, ethanol, isopropanol, with an aromatic hydroxyl compound, such as phenol, a cycloaliphatic alcohol such as a cyclohexanol or with water. The unneutralized sulfonated terpolymer has about 5 to about 50 meq. sulfonate groups per 100 grams of sulfonated polymer, more preferably about 8 to about 30, and most preferably about 10 to about 20. The meq. of unneutralized sulfonate groups per 100 grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The acid form is titrated with ethanolic sodium hydroxide to an phloxine-B end point.

The unneutralized sulfonated polymer is gel-free and hydrolytically stable. Gel is measured by stirring a given weight of polymer in a solvent comprised of 95 toluene/5 methanol at a concentration of 5 wt.% for 24 hours, allowing the mixture to settle, withdrawing a weighed sample of the supernatant solution and evaporating to dryness.

Hydrolytically stable means that the acid function in this case, the sulfonic acid, will not be eliminated under neutral or slightly basic conditions to a neutral moiety which is incapable of being converted to highly ionic functionality.

Neutralization of the unneutralized sulfonated elastomeric polymer is done by the addition of a solution of a basic salt to the unneutralized sulfonated terpolymer dissolved in the mixture of the aliphatic alcohol and nonreactive solvent. The basic salt is dissolved in a binary solvent system consisting of water and/or an aliphatic alcohol. The counterion of the basic salt is selected from the group consisting of antimony, aluminum, lead and Groups I-A, II-A, I-B and II-B of the Periodic Table of Elements and mixtures thereof. The anion of the basic salt is selected from the group consisting of a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the unneutralized sulfonated terpolymer to effect neutralization.

It is preferable to neutralize at least 95% of the unneutralized sulfonate groups, more preferably about 98%, most preferably 100%.

Examples of metal oxides useful in preparing metal sulfonates are MgO, CaO, BaO, ZnO, $Ag_2O$, $PbO_2$ and $Pb_3O_4$. Useful examples of metal hydroxides are NaOH, KOH, LiOH, $Mg(OH)_2$ and $Ba(OH)_2$.

Examples of metal oxides useful in preparing metal sulfonates are MgO, CaO, BaO, ZnO, $Ag_2O$, $PbO_2$ and $Pb_3O_4$. Useful examples of metal hydroxides used in preparing metal sulfonated elastomeric polymers are NaOH, KOH, LiOH, $Mg(OH)_2$ and $Ba(OH)_2$.

It has been observed that the sulfonated polymers formed by sulfonation often do not readily dissolve in hydrocarbons such as diesel oil or solvent 100 neutral and similar hydrocarbon solvents. The reason that these materials do not readily dissolve is due to the strong ionic interactions which persist in these sulfonated polymers.

It has been observed that the use of appropriate polar cosolvent can dramatically aid in the preparation of such solutions. The need for such cosolvents is most dramatically demonstrated with sulfonated polymers having sulfonate contents significantly above 15 milliequivalents per 100 grams of the sulfonated terpolymer. Examples of such cosolvents are aliphatic alcohol hexanol, decanol, and tridecyl alcohol employed at levels of from about 1 up to 20 parts by weight per 100 parts by weight of the oil employed in the drilling mud. The use of these cosolvents permits a more rapid dissolution process and a more complete solution from polymers which would normally be insoluble in a hydrocarbon diluent. It has also been observed at lower sulfonate levels, that is, 5 to 15 milliequivalents or even higher per 100 grams of sulfonated polymer, that these polymers can be dissolved in the absence of such cosolvents. Cosolvents which are suitable in this invention have been described in U.S. application Ser. No. 930,044 which is herein incorporated by reference.

The polar cosolvent will have a solubility parameter of at least about 8.5, more preferably at least about 9.0 and may comprise from 0.1 to 40, preferably 0.5 to 20 weight percent of the total mixture of organic liquid, ionomeric polymer, and polar cosolvent. The solvent system of polar cosolvent and organic liquid in which the neutralized sulfonated polymer is dissolved contains less than about 15 weight percent of the polar cosolvent, more preferably about 2 to 10 weight percent, and most preferably about 2 to about 5 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of alcohols, amines, di- or trifunctional alcohols, amides, acetamides, phosphates, or lactones and mixtures thereof. Especially preferred polar cosolvents are aliphatic alcohols such as butanol, hexanol, octanol, decanol, dodecanol, tridecyl alcohol, 2-ethyl hexanol etc.

Alternatively, a latex of a sulfonated polymer is described in U.S. Pat. Nos. 3,912,683 and 4,007,149, which are herein incorporated by reference, could be readily employed as a convenient method of introducing the sulfonated polymer into the oil-based drilling mud.

DETAILED DESCRIPTION OF THE PREFERRED EMBODIMENT

EXAMPLE 1

Fifty grams of a terpolymer of ethylene, propylene and 5-phenyl-2-norborene having 1.8 wt.% 5-phenyl-2-norborene, a Mooney viscosity (ML 1+8, 212° F.) of 29 was dissolved in alcohol-free chloroform. A cold solution consisting of 10.7 ml. (0.06 mole) of triethylphosphate and 5.0 ml. (0.12 mole) $SO_3$ in chloroform was prepared and 20 ml of the prepared reagent solution was added at room temperature to the polymer solution.

After 0.5 hours, half of the solution was removed and 10 ml. of methanol was added to the reaction solution which was followed by 0.1 grams of Irganox 1010 (Ciba Giegy). The polymer was steam stripped and subsequently washed in a blender at high speed with 2 liters of water. The fine crumb was collected by filtration and then treated in a blender with 2 liters of methanol. The product was collected and dried overnight in a 40° C. vacuum oven (1A).

The second half of the reaction mixture was treated in the same fashion after 1 hour reaction time (1B). Both polymer samples were repurified by dissolving 10 g in 200 ml. THF and coagulating the polymer by pouring into 500 ml. $CH_3OH$ in a blender at high speed.

Duplicate sulfur microanalysis revealed the following compositions.

| Sample | % S | Purified Sample | % S | $\frac{Meq.}{100 g}$ Polymer |
|---|---|---|---|---|
| 1A | 0.51, 0.51 | 2A | 0.51, 0.49 | 15.6 |
| 1B | 0.59, 0.59 | 2B | 0.56, 0.59 | 17.9 |

Solutions containing 10 g of 1A and 1B in 400 ml. THF were each treated with a solution of 2.63 g zinc acetate dihydrate in 20 ml. $CH_3OH$ and 1 ml. $H_2O$. The resulting solutions were steam stripped and methanol-washed in a blender followed by vacuum drying to recover the zinc salt of the polymer sulfonic acid. Analysis indicated that both products contained about 110 meq. zinc per 100 g of polymer.

Samples of 1A and 1B were each dissolved in 60 ml. THF and 3 ml. of a cold 50% $NH_3$-isopropyl alcohol mixture added. After two days, the polymer was recovered by precipitation in a blender at high speed from 450 ml. IPA plus 150 ml. $H_2O$. The filtered product was washed again in the blender with the IPA-$H_2O$, filtered, and the procedure repeated twice more with 500 ml. portions of IPA. The product was dried in vacuo at 40° C.

The ammonium salts of the sulfonated polymer had the following analysis.

| Sample | % N | $\frac{Meq.}{100 g}$ N | % S | $\frac{Meq.}{100 g}$ S |
|---|---|---|---|---|
| 3A | 0.166, 0.158 | 11.6 | 0.53, 0.55 | 16.8 |
| 3B | 0.231, 0.225 | 16.3 | 0.63, 0.64 | 19.8 |

EXAMPLE 2

Sulfonation was carried out according to the method of Example 1 and the sulfonated polymer recovered after 1 hour reaction time. Recovery and purification were as in Example 1. Microanalysis gave the following results.

| Sample | % S | $\frac{Meq.}{100 g}$ S | Purified Sample | % S | $\frac{Meq.}{100 g}$ S |
|---|---|---|---|---|---|
| A | 0.57, 0.59 | 18 | B | 0.50, 0.52 | 15.9 |

Nonaqueous titration of sample A dissolved in 95/5 toluene methanol with either alcoholic sodium acetate or trioctylamine using a phloxine B end point gave the following results.

| Titration (Meq./100 g Polymer) | | | | |
|---|---|---|---|---|
| NaOAc | (n-Octyl)$_3$N | Mean | S Micro Meq./100 g | S Titration / S Micro |
| 16.17 | 15.68 | 16.2 | 18.0 | 0.90 |
| 17.24 | 15.72 | | | |

EXAMPLE 3

A 50 g sample of an EPT polymer containing about 2 wt.% phenylnorbornene and having a Mooney viscosity of 29.9 was dissolved in 1000 ml. of alcohol-free chloroform. The reagent solution was prepared from 14.3 ml. CHCl$_3$, 10.7 ml. triethyl phosphate and 5.0 ml. SO$_3$ and a 5 ml. aliquot of the reagent added to the stirred polymer solution.

The reaction mixture was treated with 25 ml. of methanol after 35 minutes and the product recovered by steam stripping, the crumb was collected, washed in a blendor with 2.5 liters of H$_2$O followed by 3 liters methanol containing 0.35 Irganox 1010. The cake was dried overnight at ~40° C. in vacuo. Titration indicated the presence of 7.6 meq. of acid per 100 g, while sulfur analysis indicated 10.4 meq. of sulfur per 100 g.

Two 20 g portions of the product was dissolved in a mixture of 500 ml. toluene and 25 ml. methanol. Sodium acetate (0.41 g in 4.4 ml. 91% methanol H$_2$O) was added to one portion and calcium acetate monohydrate (0.44 g in 6 ml. 50% methanol-H$_2$O) to the second. The products was each precipitated in a blender with 3 liters of methanol and washed with 2 liters of methanol. The dried product was utilized in the subsequent example.

EXAMPLE 4

An oil base drilling mud was prepared by conventional laboratory methods. The mud contained No. 2 diesel oil calcium chloride water, emulsifier and a weighting material (Barite). Comparisons were made using the base mud with and without viscosifier. Conventional amine clay viscosifier is compounded to the aromatic sulfonated terpolymer of the instant invention.

The mud was aged overnight at 150° F. Aliquots of the mud were aged in pressurized cells at 300° and 400° F. for 16 hours. The cells were cooled to room temperature, depressurized, and the rheological properties of the mud were measured on a Fann Model 35 viscometer at 115° F.

The Table includes viscometric readings at 600 and 300 settings, the plastic viscosity in centipoise and the yield point in 10 minute gel strength in pounds per 100 square feet.

The results show that the viscosifying agent plays an important role in imparting desirable rheological properties to the mud and that the polymers of the instant invention compare favorably with conventional amine clays even when they are used at lower concentrations than the amine clays.

TABLE I

The Effect of Salts of Sulfonated Phenylnorbornene-Ethylene-Propylene Terpolymer On Oil Mud Viscosification[a]

| Test | 0 lb/Barrel | Amine Clay (2 lbs/Barrel) | Sulfonated Polymer (1 lb/Barrel)[b] | Sulfonated Polymer (1 lb/Barrel)[c] |
|---|---|---|---|---|
| 150° F. | | | | |
| 600 | 35 | 43 | 57 | 54 |
| 300 | 18 | 24 | 31 | 29 |
| PV | 17 | 19 | 26 | 25 |
| YP | 1 | 5 | 5 | 4 |
| 10 Gcl | 2 | 5 | 6 | 6 |
| 300° F. | | | | |
| 600 | 35 | 43 | 67 | 65 |
| 300 | 17 | 23 | 37 | 35 |
| PV | 18 | 20 | 30 | 30 |
| YP | 0 | 3 | 7 | 5 |
| 10 Gcl | 2 | 4 | 8 | 8 |
| 400° F. | | | | |
| 600 | 31 | 42 | 76 | 54 |
| 300 | 16 | 21 | 40 | 29 |
| PV | 15 | 21 | 36 | 25 |
| YP | 1 | 0 | 4 | 4 |
| 10 Gcl | 2 | 4 | 6 | 6 |

[a] Calcium chloride water.
[b] Ethylene propylene phenylnorbornene terpolymer (30 Mooney) sulfonated to 10.5 meq./100 g. of polymer sodium salt.
[c] Ethylene propylene phenylnorbornene terpolymer (30 Mooney) sulfonated to 10.5 meq./100 g. of polymer calcium salt.

We claim:

1. An oil based drilling mud which comprises:
   (a) a liquid hydrocarbon;
   (b) about 1 to about 10 parts by weight of water per 100 parts by weight of the liquid hydrocarbon;
   (c) about 20 to about 50 lb/bbl of at least one emulsifier;
   (d) weighting material of sufficient quantity necessary to achieve the desired density; and
   (e) about 0.25 to about 2 lb/bbl of a neutralized sulfonated ethylene/propylene/5-phenyl-2-norbornene terpolymer, said neutralized sulfonated polymer having about 5 to about 30 meq. of sulfonate groups per 100 grams of the neutralized sulfonated polymer, said terpolymer having about 0.5 to about 20 wt.% of said 5-phenyl-2-norbornene and said terpolymer having a number average molecular weight of about 5,000 to 300,000.

2. An oil-based drilling mud according to claim 1 wherein said emulsifier is a magnesium or calcium soap of a fatty acid.

3. An oil-based drilling mud according to claim 1 further including a wetting agent.

4. An oil-based drilling mud according to claim 3 wherein said wetting agent is an alkylaryl sulfonate.

5. An oil-based drilling mud according to claim 1 wherein said weighting material is barite or barium sulfate.

6. An oil-based drilling mud according to claims 1 or 5 wherein said sulfonate groups are neutralized with a counterion selected from the group consisting of ammonium, amines, antimony, iron, aluminum, lead and Groups I-A, II-A, I-B and II-B of the Periodic Table of Elements.

7. An oil-based drilling mud according to claims 1 or 5 further including a polar cosolvent having a solubility parameter of at least 8.5.

8. An oil-based drilling mud according to claim 7, wherein said cosolvent is an aliphatic alcohol.

9. An oil-based drilling mud according to claim 1 or 5 further including a polar cosolvent having a solubility parameter of at least 9.0.

* * * * *